United States Patent [19]

Cooper et al.

[11] Patent Number: 5,069,383

[45] Date of Patent: Dec. 3, 1991

[54] DIFFUSION BONDING AND SUPERPLASTIC FORMING

[75] Inventors: Graham A. Cooper; Ian E. Bottomley, both of Preston, United Kingdom

[73] Assignee: British Aerospace PLC, London, United Kingdom

[21] Appl. No.: 693,036

[22] Filed: Apr. 30, 1991

Related U.S. Application Data

[63] Continuation of Ser. No. 527,958, May 24, 1990, abandoned, which is a continuation-in-part of Ser. No. 373,492, Jun. 30, 1989, Pat. No. 4,948,457.

[30] Foreign Application Priority Data

May 25, 1989 [GB] United Kingdom ............... 8912025

[51] Int. Cl.⁵ .............................................. B23K 20/00
[52] U.S. Cl. .................................. 228/157; 228/193; 228/118
[58] Field of Search .............. 228/118, 157, 181, 183, 228/190, 193, 214, 263.17, 265

[56] References Cited

U.S. PATENT DOCUMENTS

| | | | |
|---|---|---|---|
| 4,197,977 | 4/1980 | Deminet | 228/106 |
| 4,426,032 | 1/1984 | Leodolter | 228/157 |
| 4,732,312 | 3/1988 | Kennedy et al. | 228/157 |
| 4,811,766 | 3/1989 | Sastry et al. | 228/107 |
| 4,942,999 | 7/1990 | Oda et al. | 228/118 |

FOREIGN PATENT DOCUMENTS

| | | |
|---|---|---|
| 0266073 | 2/1987 | European Pat. Off. . |
| 3710680 | 10/1988 | Fed. Rep. of Germany . |
| 820033 | 9/1959 | United Kingdom ............... 228/118 |
| 883359 | 11/1961 | United Kingdom ............... 228/118 |
| 1495655 | 12/1977 | United Kingdom . |
| 2095137 | 9/1982 | United Kingdom . |

OTHER PUBLICATIONS

Metals Handbook Ninth Edition, vol. 6, "Solid-State Welding", pp. 672-691, copyright 1983.

Primary Examiner—Samuel M. Heinrich
Attorney, Agent, or Firm—Kerkam, Stowell, Kondracki & Clarke

[57] ABSTRACT

In a superplastic forming/diffusion bonding process, in particular for aluminum-lithium alloys, the stop-off material in the diffusion bonding step is a porous lamellar material such as glass cloth or vermiculite paper. In one embodiment, prior to diffusion bonding, the stack of alloy sheets and lamellar material may be sealed under vacuum.

10 Claims, 5 Drawing Sheets

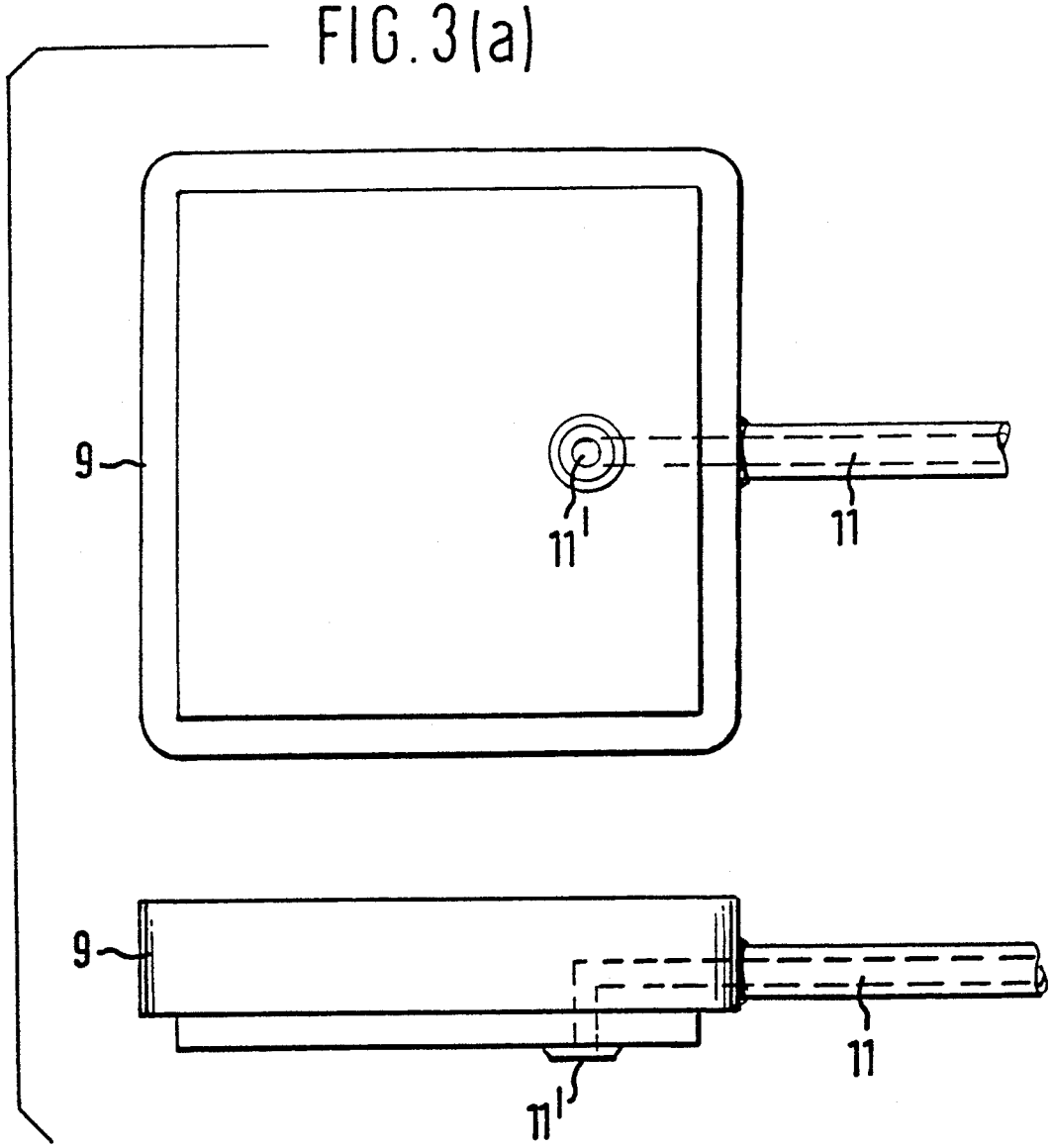

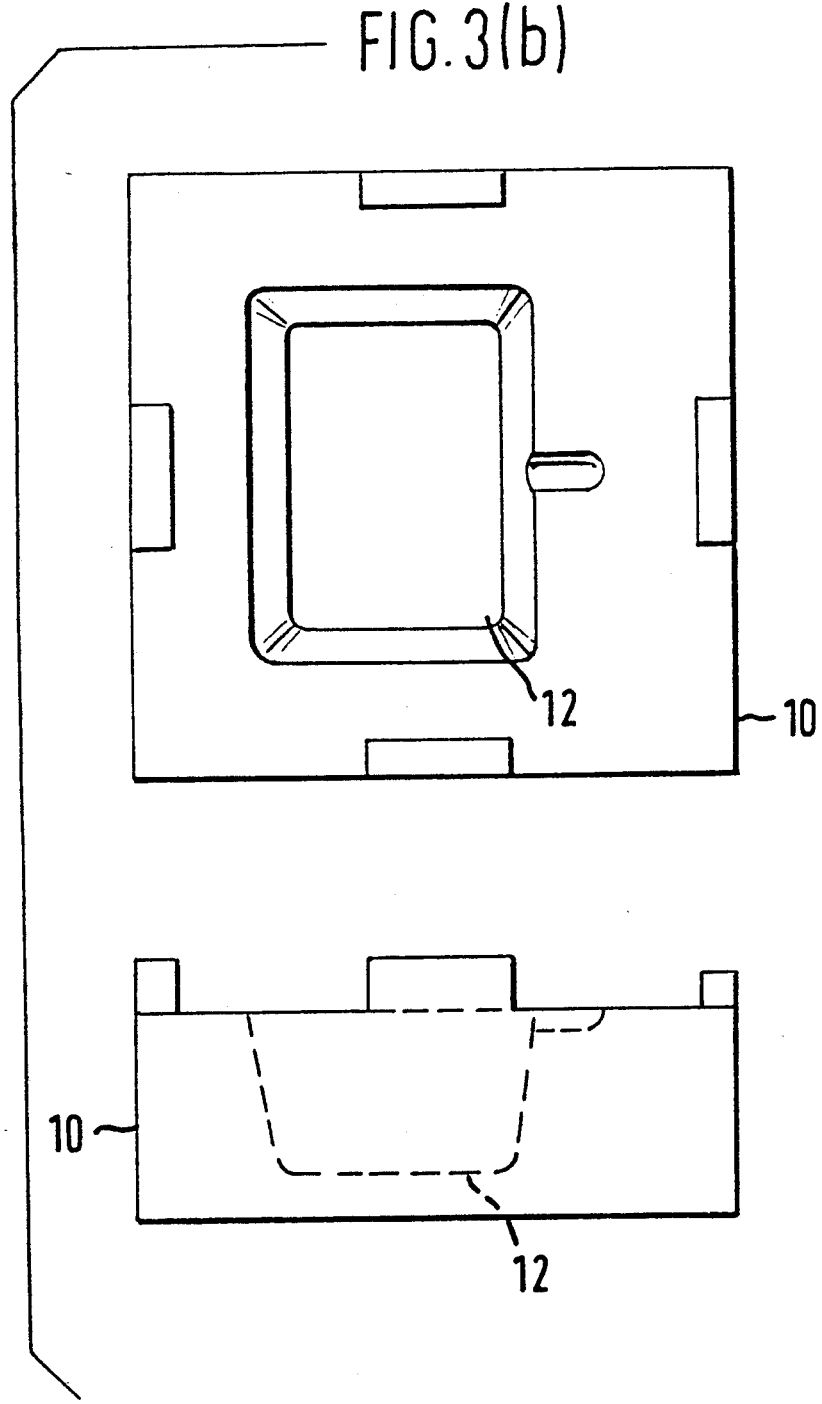

DIFFUSION BONDING AND SUPERPLASTIC FORMING

CROSS-REFERENCE TO RELATED APPLICATION

This application is a continuation of application Ser. No. 527,958, filed May 24, 1990, now abandoned, which is a continuation-in-part of co-pending application Ser. No. 373,492 to Cooper et al, filed June 30, 1989, now U.S. Pat. No. 4,948,457 claiming priority of British Application 8815663.3.

TECHNICAL FIELD

This invention relates to diffusion bonding and in particular to a stop-off material for use in the production of combined diffusion bonded and superplastically formed structures which are preferably made of aluminum or an aluminum alloy.

BACKGROUND ART

Combined diffusion bonding and superplastic forming (DB/SPF) has recently become established as a production technique, in particular with titanium alloys. To summarise the DB/SPF process: several sheets of a superplastic metal or alloy are formed into a stack and compressed at high temperature and pressures until the sheets are diffusion bonded together. In selected locations, a stop-off material is applied to the sheets to prevent bonding in these locations while permitting bonding at the remaining locations. After diffusion bonding, and also at high temperature, the superplastic forming step is conducted that is to say an inert gas is supplied under high pressure to the interior of the stack so as to 'inflate' the sheets into a three-dimensional structure. As is well known, the shape and structure of the final product is dependant on, among other things, the number of sheets in the stack and the location of the stop-off material.

In DB/SPF of titanium alloys a suitable stop-off material is fine particles of yttria in an organic resin binder, which may be applied to the sheets by conventional silk-screen printing techniques (see for example GB 2 095 137 and 1 495 655). During the DB step, which is carried out at a temperature greater than 900° C. for titanium, evaporation of the binder can contaminate the surfaces of the alloy sheets; similar problems occur in the diffusion bonding of aluminum alloys. In order to produce structures, particularly those made of an aluminum base alloy, by DB/SPF techniques satisfactorily, there remains the need for a suitable stop-off material.

DISCLOSURE OF THE INVENTION

According to the invention there is provided a method of forming a structure, which method comprises arranging a plurality of sheets of a superplastic metal (e.g. aluminum or an aluminum alloy) in a stack, interposing a lamella of inert porous material between adjacent sheets in a predetermined pattern to prevent bonding between said adjacent sheets in selected regions, diffusion bonding said stack of sheets together and then subjecting the thus bonded stack to superplastic forming.

The interposed lamella must meet certain requirements to act as a successful stop-off material. The material must be inert at the elevated temperatures concerned, typically in the region of 500° to 600° C. depending on the alloy. In addition, the material must be porous to permit gas to flow between the alloy sheets during the SPF step. Examples of suitable materials are glass cloth and vermiculite paper.

It is preferred to preheat the lamella (e) prior to said diffusion bonding to drive off any possible contaminants and preferably this is achieved at a temperature above the temperature used in the diffusion bonding step. It is also preferred that prior to the diffusion bonding step, the stack of alloy sheets and interposed lamella (e) is sealed under vacuum.

Suitable aluminum alloys are any that exhibit superplastic properties, and in particular aluminum-lithium alloys such as 8090 aluminum-lithium.

In contrast to the prior art, the present invention achieves the stopping-off of the superplastic sheets by the simple expedient of placing a self-supporting lamella of inert porous stop-off material between adjacent sheets prior to the diffusion bonding step and so does away with the necessity of applying stop-off material in a liquid vehicle, e.g. by silk screen printing, and so avoids the consequent problems of contamination by the liquid vehicle used in such printing.

BRIEF DESCRIPTION OF THE DRAWINGS

An embodiment of the invention will now be described by way of example and with reference to the accompanying drawings, in which:

FIGS. 3(a) and (b) are views of upper and lower superplastic forming tools;

BEST MODE OF PERFORMING THE INVENTION

Figure 1A:
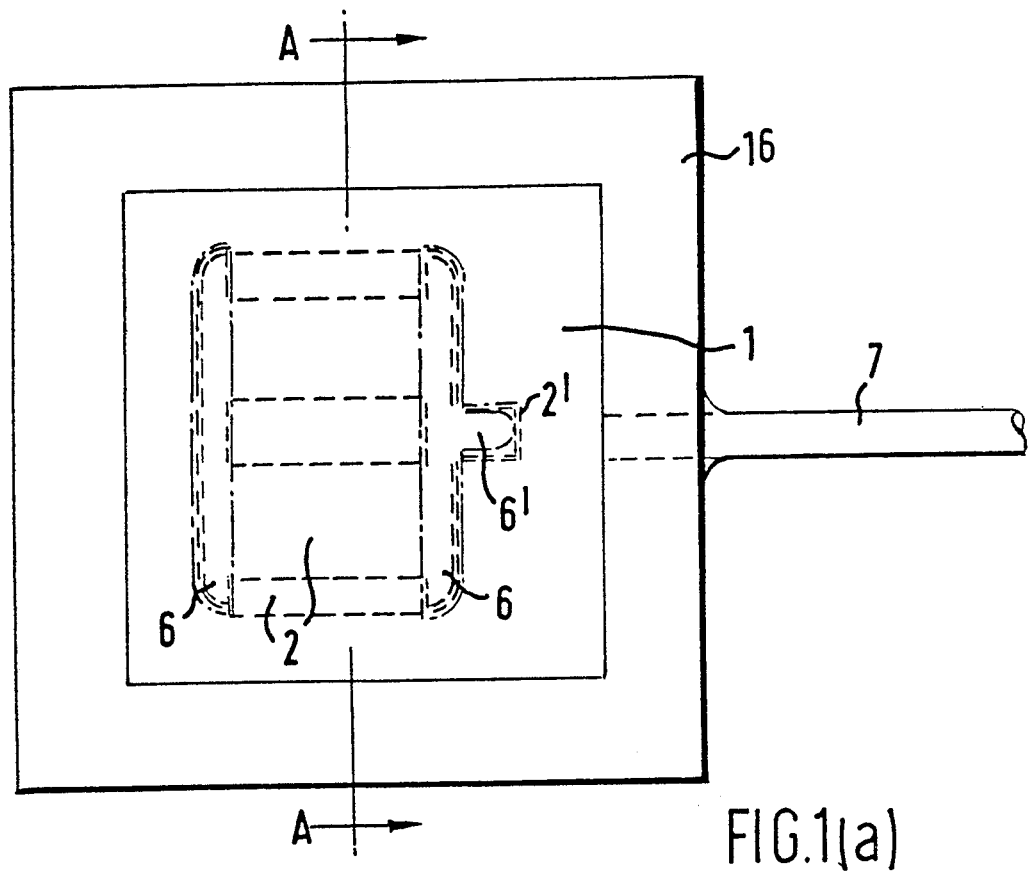
FIGS. 1(a) and (b) are views in plan and section respectively of an appartus for the diffusion bonding of a stack of alloy sheets.
Figure 1B:
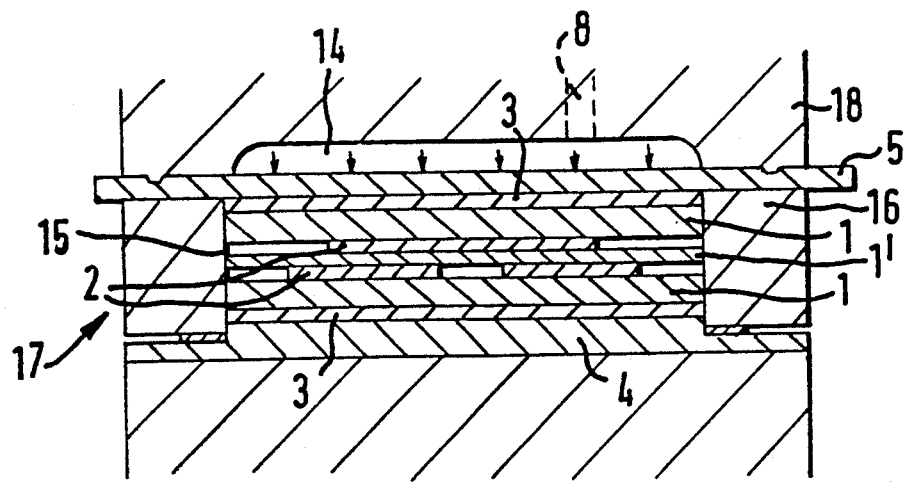

Referring firstly to FIG. 1(b), which is a section along line A—A of FIG. 1(a), there is shown a diffusion bonding pack. The pack comprises a stack of two outer or face sheets 1 of 8090 aluminum-lithium alloy, a core sheet 1' also made of 8090 aluminum-lithium alloy, the core sheet 1' being separated from the face sheets 1 by two thin masks 2 formed of glass cloth. The stack of alloy sheets is sandwiched between spacer elements 3, and is located in the cavity 15 in the base 16 of a press 17 between a base element 4 and an upper diaphragm 5, which is made of a superplastic material.

Before being formed into the bonding pack as shown in FIG. 1, the alloy sheets 1,1' and the glass cloth masks 2 are pretreated. In particular the sheets are chemically cleaned and the surfaces to be bonded are grit blasted using aluminum oxide. The glass masks are pre-baked at 590° C. for one hour to drive off any organic binders or other possible contaminants.

Figure 2A:
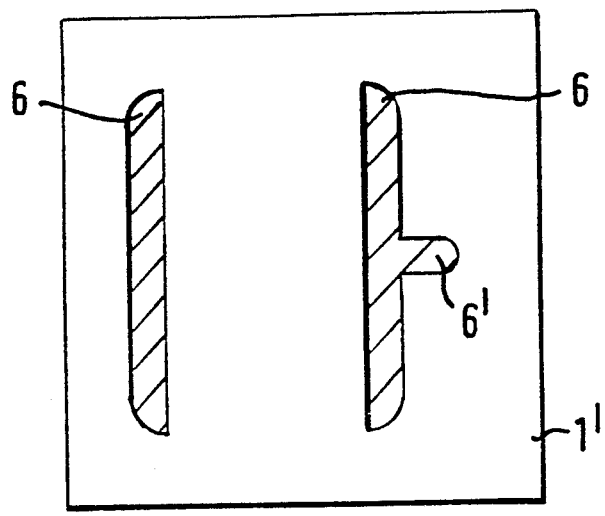
FIGS. 2(a), (b) and (c) are plan views of an alloy core sheet and two stop-off masks, respectively.
Figure 2B:
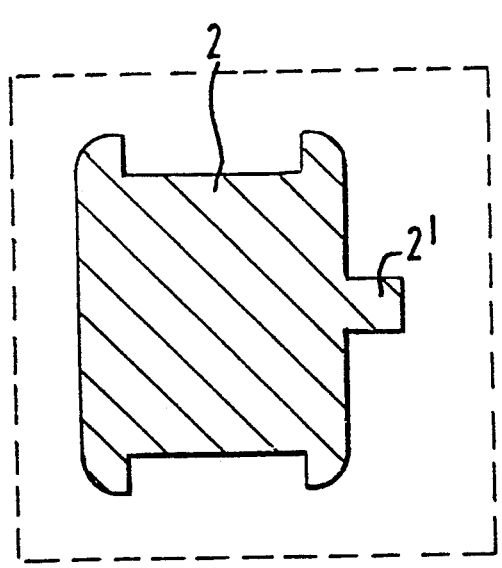
Figure 2C:
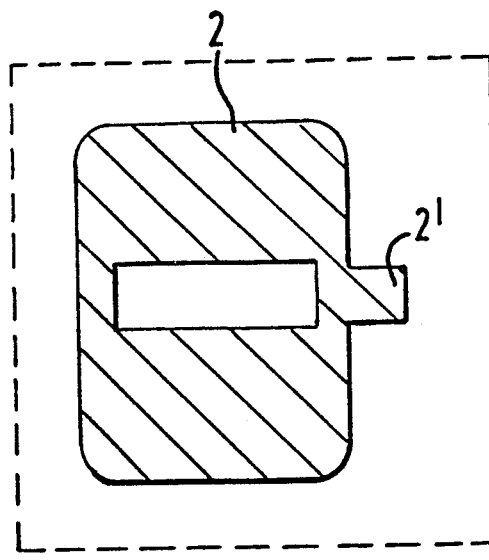

The outer two alloy sheets 1 are uninterrupted squares or rectangles, but the inner or core sheet 1', as shown in FIG. 2(a), has two cut-away portions 6 which are partly complementary in shape to the two masks 2 that are shown in FIGS. 2(b) and 2(c). FIG. 2(b) shows the upper of the two masks (as viewed in in FIG. 1(b)), and FIG. 2(c) the lower of the pair. It will be appreciated that when the alloy sheets and masks are superimposed in the bonding pack, the masks will prevent bonding of the alloy sheets in selected locations by stopping the sheets from contacting one another. The shapes of the masks 2 and the core sheet 1' are shown by broken lines in FIG. 1(a).

The prepared sheets are formed into the bonding pack along with the glass cloth masks as shown in FIG. 1(b). The bonding pack is then loaded into the cavity 15 of the press which is preheated to 560° C., the membrane is placed over the pack and the press is sealed by clamping the top 18 of the press against the base 16 thereby compressing the edges of the membrane 5 and sealing the cavity 15. While heating up to the required bonding temperature, the cavity 15 is evacuated for 10 minutes to achieve a vacuum of $10^{-6}$ mbar or better. This evacuation is carried out via a vacuum pipe 7 passing through the wall of the base 16 and connected to a pump (not shown).

After the pack has reached the required temperature, a bonding pressure of 1000 psi (7 MPa) is applied to the pack by supplying pressurised gas through inlet 8 to the space 14 above the diaphragm 5. The bonding pressure and temperature are maintained for as long as is necessary to achieve diffusion bonding; typically a period of 3 hours. After diffusion bonding has taken place, the pack is removed from the press and allowed to cool.

Figure 4:
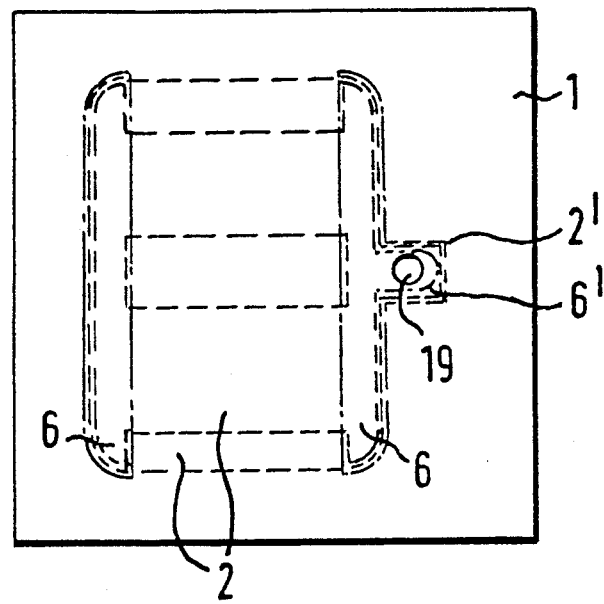
FIG. 4 is a plan view of a diffusion bonded stack ready for superplastic forming.

After cooling, a gas-supply hole 19 (see FIG. 4) is drilled in the pack of bonded sheets (the shapes of the masks 2 and of the core sheet 1' are shown by broken lines in FIG. 4); the hole 19 passes through a tail part 6' in the cut-out section 6 of the core sheet 1' (see also FIG. 2(a)) and through a tail part 2' in the stop-off masks 2 (see also FIG. 2(b) and (c)) to allow gas to be injected into the interior of the pack, as described in more detail below; the hole 19 does not, however, extend all the way through the stack of sheets and does not pass through the lower face sheet 1. The pack is then loaded into the superplastic forming (SPF) tooling shown in FIGS. 3(a) and (b). The SPF tooling includes an upper tool part 9, shown in FIG. 3(a), and a lower tool part 10 shown in FIG. 3(b). The upper tool part 9 is provided with a supply line 11 for the supply of an inert gas, such as argon or compressed air, to the diffusion bonded pack during the SPF step; the outlet 11' of the gas supply line 11 is located in register with the above-described gas-supply hole 19 that has been drilled in the pack. The lower tool part 10 is formed with an internal surface 12 corresponding to the outer surface of the structure to be formed.

After the bonded stack has been loaded into the SPF tool, the tool is placed in a preheated press (530° C.) and the temperature allowed to stabilise (which takes approximately 20 minutes). Compressed air is then injected into the interior of the pack via supply line 11 and the gas-supply hole 19 drilled in the pack, the gas pressure being controlled to produce an optimum pressure-time cycle which may be calculated in advance using computer modelling techniques.

Figure 5:
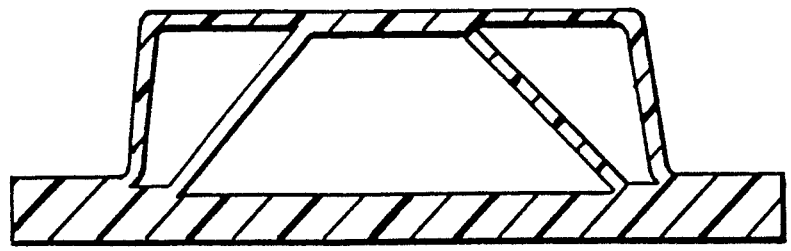
FIG. 5 is section through a structure formed by the process of the present invention.

The porous nature of the masks allows the gas under pressure to permeate from the gas-supply hole 19 to the interface between the sheets of the bonded stack where they are not bonded, and the gas pressure, in conjunction with the high temperature, causes the stack to inflate superplastically into the recess 12 formed in the lower tool 10 until the final structure is obtained, which is then allowed to cool. FIG. 5 shows in section the structure obtained with the sheets and masks of FIGS. 1 and 2.

In addition to the above method it may be advisable to seal the stack under vacuum prior to diffusion bonding by means of electron beam welding. This would reduce the possibility of the porous lamellar masks trapping appreciable quantities of air that would result in the subsequent formation of undesirable oxides. Such sealing would also increase substantially the 'shelf-life' of the stacks of sheets once they have been cleaned and prepared for bonding, that is to say the time between, on the one hand, the pre-treatment of the alloy sheets and the assembly of the bonding pack and, on the other hand, the diffusion bonding of the pack. Furthermore, such sealing of the sheets under vacuum prior to bonding would allow for the option of carrying out the diffusion bonding by hot isostatic pressure techniques (HIP).

We claim:

1. A method of forming a structure having an internal cavity, which method comprises
   (a) arranging a plurality of sheets of a superplastic metal in a stack,
   (b) interposing a self-supporting lamella of predetermined shape of inert porous material between adjacent sheets to prevent bonding between said adjacent sheets in selected regions thereof covered by the lamella, while permitting bonding to occur in other regions not covered by the lamella,
   (c) subjecting the stack of sheets to diffusion bonding to bond the sheets together in the said other regions,
   (d) subjecting the thus bonded stack to superplastic forming to form the said structure by
      (i) placing the stack in a mould,
      (ii) heating the stack to a temperature at which the metal becomes superplastic and
      (iii) injecting a gas between the sheets at one or more selected points to inflate the stack to conform to the shape of the mould, thereby also forming the said cavity within the structure, said gas passing from the gas injection point through the porous lamella to reach the said selected regions, and
   (e) removing the structure from the mould.

2. A method according to claim 1, wherein said lamella comprises a mat, paper or cloth.

3. A method according to claim 1, wherein said lamella of inert porous material comprises a filamentary material.

4. A method according to claim 3, wherein the lamella of filamentary material comprises a glass cloth.

5. A method according to claim 1, wherein said lamella of inert porous material comprises vermiculite paper.

6. A method according to claim 1, wherein said lamellar material is preheated prior to said diffusion bonding to drive off any contaminants.

7. A method according to claim 6, wherein the said lamella of inert porous material is preheated prior to said diffusion bonding step to a temperature in excess of the temperature of the diffusion bonding step.

8. A method according to claim 1, wherein said stack, prior to said diffusion bonding, is sealed under vacuum.

9. A method according to claim 1, wherein said superplastic metal is selected from the group consisting of aluminum and aluminum alloys.

10. A method according to claim 9, wherein said aluminum alloy is an aluminum-lithium alloy.

* * * * *